US011020797B2

(12) United States Patent
Pascall et al.

(10) Patent No.: US 11,020,797 B2
(45) Date of Patent: Jun. 1, 2021

(54) SYSTEM AND METHOD FOR CONTROLLING OXIDATION OF METALS DURING FREEFORM CASTING

(71) Applicant: Lawrence Livermore National Security, LLC, Livermore, CA (US)

(72) Inventors: Andrew J. Pascall, Livermore, CA (US); Joshua David Kuntz, Livermore, CA (US); Scott K. McCall, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 160 days.

(21) Appl. No.: 16/141,437

(22) Filed: Sep. 25, 2018

(65) Prior Publication Data

US 2020/0094317 A1 Mar. 26, 2020

(51) Int. Cl.
*B22D 23/00* (2006.01)
*B22D 45/00* (2006.01)
*B33Y 10/00* (2015.01)
*B33Y 30/00* (2015.01)

(52) U.S. Cl.
CPC .......... *B22D 23/003* (2013.01); *B22D 45/00* (2013.01); *B33Y 10/00* (2014.12); *B33Y 30/00* (2014.12)

(58) Field of Classification Search
CPC ...... B22D 23/003; B22D 45/00; B33Y 10/00; B33Y 30/00
USPC ..... 222/591; 700/119; 264/129, 176.1, 40.6, 264/255, 298, 308; 425/113, 461, 143, 425/190, 191, 375
See application file for complete search history.

(56) References Cited

U.S. PATENT DOCUMENTS

| 5,573,721 | A | * | 11/1996 | Gillette | B29C 41/12 264/401 |
| 5,740,051 | A | * | 4/1998 | Sanders, Jr. | B29C 64/40 700/119 |
| 6,942,830 | B2 | * | 9/2005 | Mulhaupt | B33Y 30/00 264/255 |
| 7,790,074 | B2 | * | 9/2010 | Pan | B33Y 10/00 264/40.1 |
| 10,189,081 | B2 | | 1/2019 | Pascall et al. | |

(Continued)

OTHER PUBLICATIONS

Rice, C.S., Mendez, P.F. and Brown, S.B., 2000. Metal solid freeform fabrication using semi-solid slurries. JOM, 52 (12), pp. 31-33.

(Continued)

*Primary Examiner* — Scott R Kastler
*Assistant Examiner* — Michael Aboagye
(74) *Attorney, Agent, or Firm* — Harness, Dickey & Pierce, P.L.C.

(57) ABSTRACT

A system is disclosed for printing a component. The system may have a nozzle controlled for movement within a plane. The nozzle may be configured to dispense a molten metal. A substrate may be positioned within a reservoir. The substrate may receive the molten metal to form the component in a printing operation. A heated barrier material in a molten state may be contained within the reservoir for forming a liquid barrier between an atmosphere and the substrate. The nozzle has a tip which is submerged within the liquid barrier while dispensing the molten metal during the printing operation. The liquid barrier forms a barrier between an atmosphere in a vicinity of the substrate and the substrate.

19 Claims, 3 Drawing Sheets

(56) References Cited

U.S. PATENT DOCUMENTS

Figure 1:
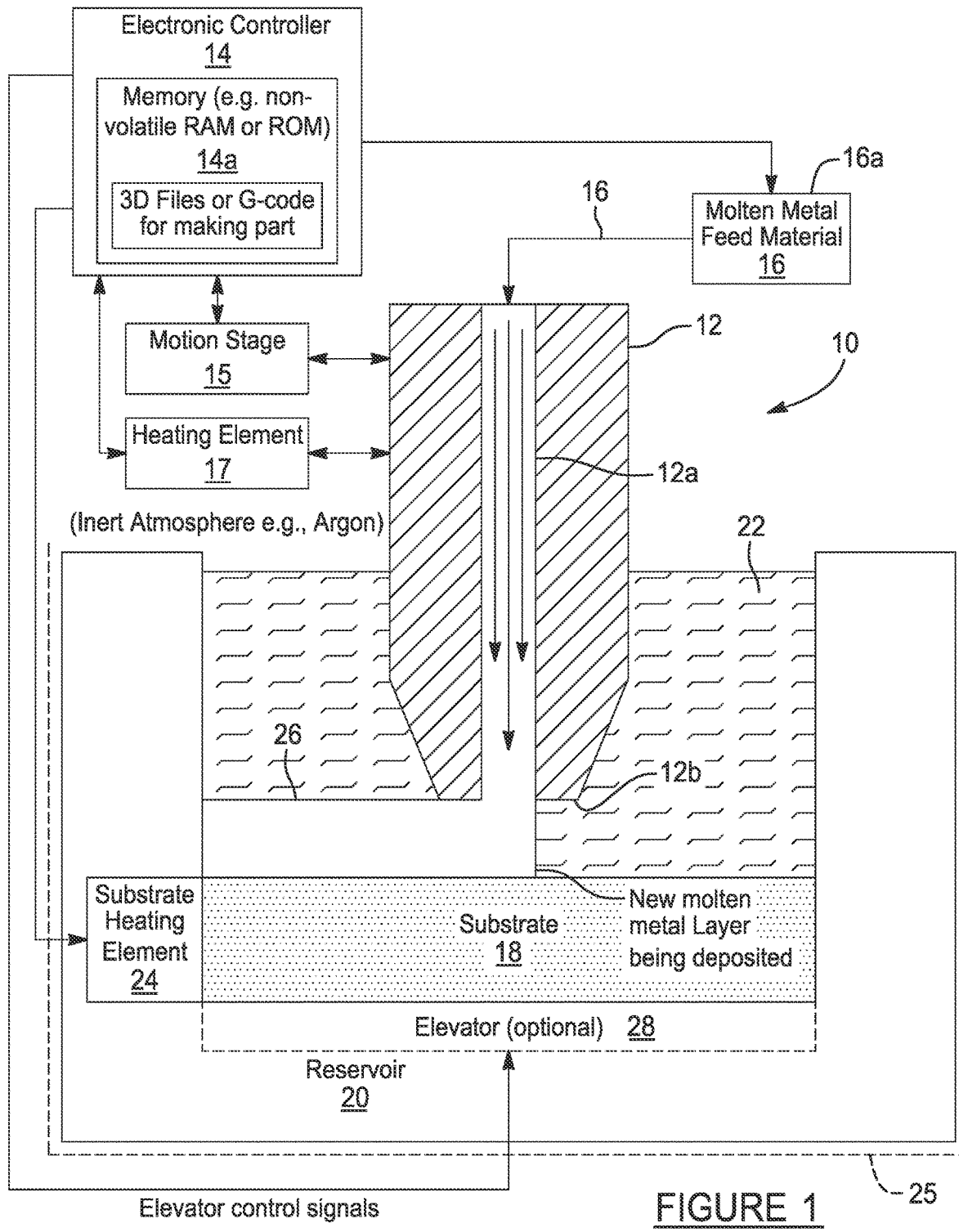

2017/0203357 A1     7/2017  Pascall et al.
2017/0232679 A1*    8/2017  Gardiner ............... B33Y 50/02
                                                      425/162

OTHER PUBLICATIONS

Zhu, C., Han, T.Y.J., Duoss, E.B., Golobic, A.M., Kuntz, J.D., Spadaccini, C.M. and Worsley, M.A., 2015. Highly compressible 3D periodic graphene aerogel microlattices. Nature communications, 6, p. 6962.

* cited by examiner

SYSTEM AND METHOD FOR CONTROLLING OXIDATION OF METALS DURING FREEFORM CASTING

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods directed to freeform casting processes, and more particularly to systems and methods for preventing oxidation of a surface of a metal part or layer during a freeform casting operation.

BACKGROUND

This section provides background information related to the present disclosure which is not necessarily prior art.

Oxidation of metal parts occurring during freeform casting and other additive manufacturing processes has been a significant challenge that has not been adequately addressed. Oxidation of a metal part, or metal layer of a part, can occur when the metal part (or layer) comes in contact with an atmosphere containing oxygen. In such instances a thin layer of oxide is formed on the surface of the metal part or layer. This is highly undesirable during an additive manufacturing process, where a part is being constructed in a layer-by-layer fashion.

SUMMARY

This section provides a general summary of the disclosure and is not a comprehensive disclosure of its full scope or all of its features.

In one aspect the present disclosure relates to a system for printing a component. The system may comprise a nozzle configured to dispense heated molten metal, a reservoir and a substrate positioned within the reservoir. The substrate receives the molten metal thereon. The molten metal is used to form the component in a printing operation. A heated barrier material in a molten state is contained within the reservoir for forming a liquid barrier between an atmosphere and the molten metal during the printing operation. The nozzle may have a tip submerged within the liquid barrier while the nozzle is dispensing the molten metal during the printing operation. The liquid barrier forms a barrier between an atmosphere in a vicinity of the substrate and the substrate during the printing operation.

In another aspect the present disclosure relates to a system for printing a component. The system may comprise a controller and a nozzle controlled for movement by the controller within a two dimensional plane. The nozzle may be configured to dispense a molten metal during a printing operation into a reservoir. A substrate may be positioned within the reservoir on which to receive the molten metal, the molten metal being used to form the component on the substrate in a layer-by-layer fashion. A heated barrier material in a molten state may be contained within the reservoir for forming a liquid barrier. The nozzle may have a tip configured to be submerged within the liquid barrier while dispensing the molten metal during the printing operation. The liquid barrier forms a barrier between an atmosphere in a vicinity of the substrate and the substrate.

In still another aspect the present disclosure relates to a method for printing a component. The method may comprise using a reservoir to hold a barrier material heated to a flowable state to form a liquid barrier. The method may further include positioning a substrate within the reservoir and submerged in the liquid barrier. The method may further include positioning a nozzle at least partially within the liquid barrier such that a tip of the nozzle is submerged in the liquid barrier and disposed adjacent the substrate. The method may further include flowing a molten metal through the nozzle onto the substrate and moving the nozzle as necessary to form at least a portion of the component. The method may further include using the liquid barrier to insulate the substrate and molten metal from an ambient atmosphere while the molten metal is being applied during a printing operation to prevent oxidation of the molten metal.

Further areas of applicability will become apparent from the description provided herein. The description and specific examples in this summary are intended for purposes of illustration only and are not intended to limit the scope of the present disclosure.

DRAWINGS

Figure 2:
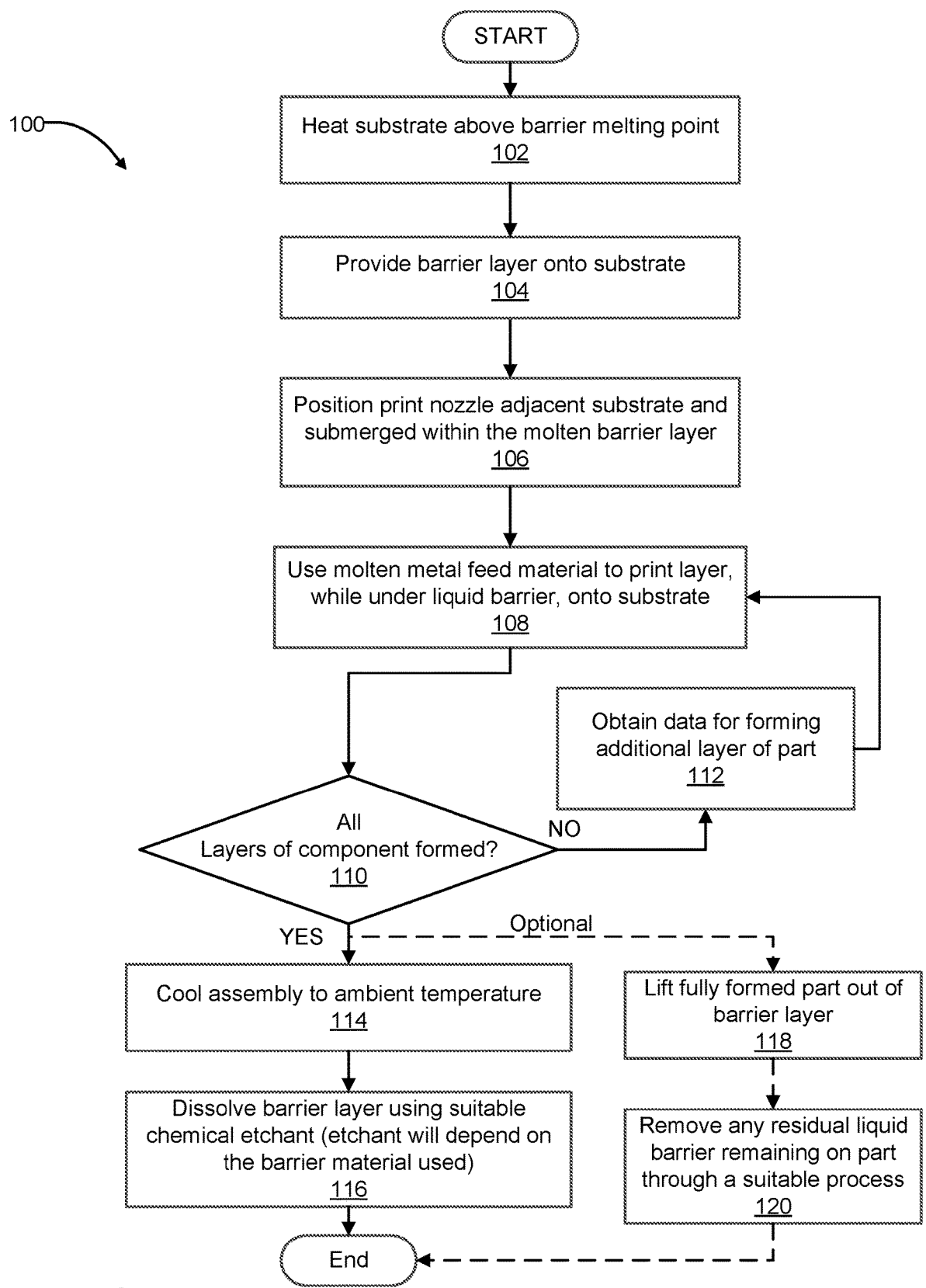
Figure 3:
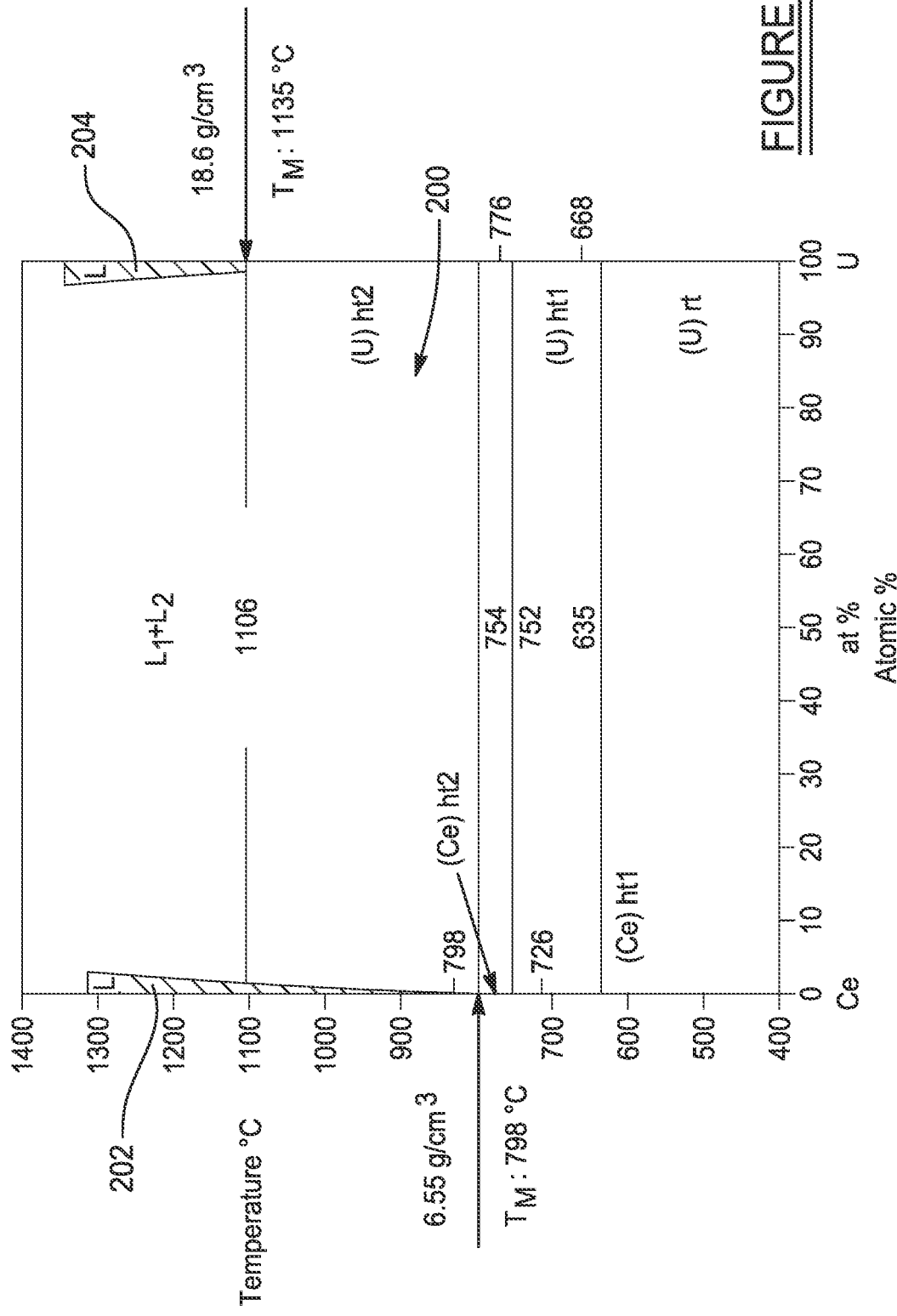

The drawings described herein are for illustrative purposes only of selected embodiments and not all possible implementations, and are not intended to limit the scope of the present disclosure. In the drawings:

FIG. 1 is a high level block diagram illustrating major components of one example embodiment of a system that may be used to carry a freeform casting operation in accordance with the present disclosure;

FIG. 2 is a high level flowchart illustrating various operations that may be carried out in accordance with a method of the present disclosure; and FIG. 3 is a graph illustrating a printing window when Cerium is used as a barrier material and Uranium is used as the molten metal being printed. The barrier is maintained at a temperature above the melting point cerium, but below the melting point of uranium. As evident in the diagram, the mutual solubility of cerium and uranium is near zero which is ideal for this process.

Corresponding reference numerals indicate corresponding parts throughout the several views of the drawings.

DETAILED DESCRIPTION

Example embodiments will now be described more fully with reference to the accompanying drawings.

The present disclosure addresses the problem of oxidation of a metal part during a freeform casting or additive manufacturing process, which may be referred to herein broadly as "printing" operations or processes. During such a printing process, oxide will be formed by contact of the exposed, printed metal surface of a just-formed material layer of a component, when the metal surface comes into contact with an atmosphere containing oxygen. The present disclosure involves printing the liquid metal being used to form a layer of a part during a freeform casting additive manufacturing ("AM") process directly into an additional liquid. The additional liquid acts as a barrier to prevent oxygen from reacting with the surface of the printed metal layer during a printing process. This barrier may be any liquid that has several characteristics, namely: i) it has a melting point lower than the melting point of the metal to be printed and a boiling point above the printing temperature; ii) it is relatively unreactive with the printed metal; iii) the printed metal material has a low solubility in the liquid barrier, and conversely as the barrier has a low solubility in the printed metal material, or the liquid barrier is saturated with dissolved printed metal; iv) the liquid barrier is unreactive with the nozzle material; and (v) the liquid barrier is less dense than the printed metal material.

Furthermore, it is advantageous that the liquid barrier be easily removable after printing is complete. This can be by, for example, pouring off the liquid from the just-printed layer of the part. Another way to remove the liquid barrier may be by using a freeform casting process by which the part is constructed on an elevator that can be lifted out of the liquid barrier. Still further, the liquid barrier, once it hardens, can be melted out in a post-processing step, or chemically dissolved. Preferably, the liquid has a higher affinity for oxygen than the printed metal. The liquid may be another liquid metal, or a molten salt.

FIG. 1 shows one example of a system 10 that may be used to construct a freeform cast AM part. The system 10 may make use of a printing nozzle 12 whose movement is controlled within an X-Y plane, as well as vertically, by an electronic controller 14 which controls a motion stage 15. The motion stage 15 may be controlled by the electronic controller 14 to move the nozzle in X and Y directions with a plane, as well as up and down. The electronic controller 14 may include a memory 14a, for example a RAM or ROM, which includes the 3D data files needed to form the part, or the data needed to form the part may be G-code to control the motion stage 15. In either event, the data is sufficient to enable each two dimensional layer of the part to be printed to form a complete part.

The nozzle 12 may receive molten metal feed material from a feed reservoir 16a. The molten metal feed material 16 may be created from metal ingots or powder particles heated to a molten state in the molten metal feed reservoir 16a. The molten metal feed material 16 may be, for example and without limitation, molten Aluminum or molten Cerium. However, it will be appreciated that the present disclosure is not limited to use with only the above-mentioned metals. The nozzle 12 may optionally be heated by a heating element 17 controlled by the electronic controller 14 or by a different component. The molten metal 16 may be supplied, for example, by gravity feed through a bore 12a in the nozzle 12, by any other suitable feeding mechanism, such as supplying an overpressure of inert atmosphere to the molten metal feed reservoir 16a. The nozzle 12 includes a tip 12b which is positioned in close proximity to a substrate 18, for example on the order of 10 mm-0.01 mm from an upper surface of the substrate. The substrate 18 may be positioned within a reservoir 20. Within the reservoir 20, a quantity of a molten liquid barrier 22 meeting the considerations enumerated above may be contained.

The nozzle 12 is also preferably constructed of a material which has a higher melting point than the molten metal 16. Furthermore, the nozzle 12 is preferably formed from a material which is not reactive with the material used for the liquid barrier 22. Possible suitable materials for the nozzle 12 are Tungsten, Tungsten Carbide, Tantalum, graphite, and yttria-coated graphite.

The liquid barrier 22 may be formed by virtually any material meeting the above-described criteria. However, the following specific preferred materials for forming the liquid barrier 22 may be preferred when used with specific molten metals to form the part 26:

for printing Aluminum metal: Sodium, Potassium eutectic KF—AlF3, Bismuth, Cadmium and Indium;

for printing with Cerium metal: Calcium; and for printing with Uranium metal: Calcium, Magnesium, Cerium, Lanthanum, Silver, Europium, Neodymium, Samarium, eutectic KCl—LiCl. For the above-listed metals, molten Cerium or molten Calcium are particularly effective for use with the system 10.

The liquid barrier 22 has a depth so that the nozzle tip 12b and the layer to be formed are preferably completely submerged in the liquid barrier. The liquid barrier 22 thus acts as a complete barrier to the atmosphere above and around the nozzle 12, and fully insulates the substrate 18 and the material layer being formed from the atmosphere while the material layer is being formed.

A substrate heating element 24, controlled by the controller 14 or a different component, may be used to heat the substrate 18 to a predetermined temperature. Optionally, the heating element 24 could be built directly into the walls of the reservoir 20. Another option may be to position the reservoir 20 within a furnace 25 which provides the needed heat to turn the barrier material into the liquid barrier 22 as well as to possibly heat the substrate 18. With such an embodiment, the substrate heating element 24 may not be needed. However, if the substrate heating element 24 is used, then it may be possible to provide the barrier material in a solid form, which is applied directly to the substrate, and then subsequently heated by the substrate heating element to turn it into the liquid barrier 22.

If molten Cerium or Calcium is being used as the liquid barrier 22, and Uranium as the molten metal 16, then preferably the substrate 18 may be heated to at least about 800° C.-1100° C. Again, this selected heating temperature for the substrate 18 will depend also on the specific metal material being used to form the part.

In order to print a part, a portion 26 of which is shown in FIG. 1, the printing nozzle 12 is dipped into the liquid barrier 22 and the molten metal feed material 16 is extruded directly through the nozzle bore 12a, and flows through nozzle tip 12b, through the liquid barrier and onto the upper surface of the heated substrate 18 (i.e., sometimes also referred to as a "build plate"). In effect, portions of the liquid barrier 22 in the flow path of the molten metal feed material 16 are displaced away from the substrate 18 upper surface as the molten metal feed material 16 flows toward and onto the upper surface of the substrate. Heating the substrate 18 helps to solidify the material 16 to form the layer of the part 26, but may not be required in all implementations of the system 10.

After the part 26 has solidified it can be removed from the liquid barrier 22 by any one of several different methods. For example, the liquid barrier 22 may be removed by pouring the liquid barrier out from the reservoir 20 and off of the newly formed part 26 layer. Optionally, an elevator 28, for example controlled by a motor, which is in turn controlled by the controller 14, may be used to lift the substrate 18 out of the reservoir 20. Any other suitable means or mechanism for controllably lifting and lowering the substrate 18 could be used as well.

If the liquid barrier 22 has solidified during the part forming process, then another option for removing the solidified liquid barrier is melting it off in a post processing operation. Still another way to remove the solidified liquid barrier may be to dissolve it in a suitable chemical solution. The present disclosure is not limited to any particular manner of removing the liquid barrier if it solidifies during the part forming process.

Referring to FIG. 2, a flowchart 100 is shown which summarizes various operations that may be performed using the system 10, to carry out one example of the method of the present disclosure. At operation 102 the substrate 18 may be heated above the barrier material melting point. At operation 104 the barrier material, once heated to a flowable (i.e., liquid or molten) state, may be fed as the liquid barrier 22 into the reservoir 20 and onto the substrate 18. Optionally, the barrier material may be provided as a solid, as described hereinbefore, and then melted, assuming that the substrate heater 24 is being used, to thus form the liquid barrier 22.

At operation 106 the printing nozzle 12 may be positioned with its tip 12b closely adjacent the substrate 18, and fully submerged in the liquid barrier 22. At operation 108, the molten metal feed material 16 may be fed into and through the nozzle 12 onto the upper surface of the substrate 18. The molten metal feed material 16 is used to print a layer of the part while fully submerged in the liquid barrier 22. At operation 110 a check is made by the electronic controller 14 to determine if all of the layers of the part have been formed, and if not, then at operation 112 the electronic controller provides the additional 3D data or G-code to the motion stage 15 needed to form the next layer, as indicated at operation 112. Operations 108-110 may then be re-performed.

Once the check at operation 110 indicates that the part is fully formed (i.e., all layers of the part have been completed), then at operation 114 the completed part may be allowed to cool down to an ambient temperature or close to an ambient temperature. At operation 116, the liquid barrier 22, which by now has solidified, may be dissolved in a suitable etchant (e.g., diluted acid), for example diluted sulfuric acid, or any other suitable chemical etchant. Operation 116 assumes that the liquid barrier 22 has solidified, but optionally the liquid barrier could be emptied from the reservoir 20 if it is still in a flowable condition. At this point the fully formed part may be removed from the substrate 18. Optionally, when all layers of the part have been formed, the part may be lifted out of the liquid barrier 22, as indicated at operation 118, and then any residual liquid barrier 22 material present on the part may be removed though a suitable process. Both scenarios are contemplated by the present disclosure.

FIG. 3 illustrates a typical phase diagram for a molten blanket-printing material system. The molten metal 16 will be supplied from the molten metal reservoir 16a at a temperature corresponding to shaded region 204 in the phase diagram. The region 200 may be viewed as the "molten blanket operational window" where the molten blanket, in this case Cerium, is in the liquid state and the printing material, in this case Uranium, would be in the solid state. The Cerium has a melt temperature of about 798° C. while the Uranium has a melt temperature of about 1135° C. Shaded region 202 represents that area where only a Cerium-rich liquid present, and shaded region 204 represents the area where a Uranium-rich liquid is present. The 18.6 g/cm$^3$ density of the Uranium is important because it is higher than the 6.55 g/cm$^3$ density of the Cerium, which makes the molten Uranium want to sink in the molten Cerium and remain on the substrate 18 during the printing operation.

The present disclosure thus provides a system and method by which a liquid oxygen blocking layer may be placed over a substrate (i.e., build plate) to limit oxide formation on a metallic layer of a part being formed. The part is printed directly into the liquid oxide blocking layer, which may be another liquid metal or a molten salt. The liquid oxide blocking layer may then be removed by draining, melting, chemical etching or chemical dissolution, or by any other suitable method, after the part is fully formed.

It will be appreciated that use of flux in welding and soldering applications might, at first thought, appear similar to the system and method of the present disclosure. However, the system and method of the present disclosure is differentiated from a flux-based welding system/operation in that with such an application, the flux is applied to a workpiece before operations are commenced to form the workpiece. The flux in a welding operation also typically removes oxide from existing metal pieces. However, with the system and method of the present disclosure, the purpose of the liquid blanket is to prevent initial oxidation of the surface.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for printing a component, comprising:
using a reservoir to hold a barrier material heated to a flowable state to form a heated liquid barrier;
positioning a substrate within the reservoir and submerged in the heated liquid barrier;
positioning a nozzle at least partially within the liquid barrier such that a tip of the nozzle is submerged in the liquid barrier and disposed adjacent the substrate;
flowing a molten metal through the nozzle onto the substrate and moving the nozzle as necessary to form at least a portion of the component; and
using the heated liquid barrier to form a barrier which fully covers, encapsulates and insulates the substrate and molten metal from an ambient atmosphere in a vicinity of the substrate while the molten metal is being applied during a printing operation to prevent oxidation of the molten metal; and
wherein the molten metal is non-reactive with the heated barrier material, so that the molten metal forms the component without interference from, and exclusive of, the heated barrier material.

2. A system for printing a component, comprising:
a nozzle having a tip, the nozzle configured to dispense heated molten metal from the tip;
a reservoir;
a substrate positioned within the reservoir on which to receive the molten metal, the molten metal being used to form the component in a printing operation; and
a heated barrier material in a molten state contained within the reservoir for forming a liquid barrier between an atmosphere and the molten metal during the printing operation; and
the heated barrier material having a depth such that the tip of the nozzle is fully submerged within the liquid barrier while the nozzle is dispensing the molten metal during the printing operation, the liquid barrier forming a barrier which fully covers and encapsulates the molten metal, to thus form a barrier between an atmosphere in a vicinity of the substrate and the substrate during the printing operation, to prevent exposure of the molten metal to the atmosphere while the molten metal is being dispensed from the nozzle tip and applied to the substrate, and such that the molten metal is non-reactive with the heated barrier material, so that the molten metal forms the component without interference from, and exclusive of, the heated barrier material.

3. The system of claim 2, wherein the heated barrier material is removable from a surface of the component formed on the substrate after completing the printing operation.

4. The system of claim 2, wherein the heated barrier material comprises at least one of Cerium and Calcium, heated to a molten, flowable condition.

5. The system of claim 3, wherein the heated barrier material is removable through at least one of a chemical etching operation or a chemical dissolution operation from a newly formed material layer after formation of the new material layer.

6. The system of claim 2, wherein the molten metal comprises molten Aluminum.

7. The system of claim 6, wherein the heated barrier material comprises one of:
Sodium;
Potassium;
eutectic KF—AlF3;
Bismuth;
Cadmium; and
Indium.

8. The system of claim 2, wherein the molten metal used to perform the printing operation comprises Cerium.

9. The system of claim 2, wherein the molten metal used to perform the printing operation comprises Uranium.

10. The system of claim 9, wherein the heated barrier material comprises one of:
Calcium;
Magnesium;
Cerium;
Lanthanum;
Silver;
Europium;
Neodymium;
Samarium; and
eutectic KCl—LiCl.

11. The system of claim 2, wherein the heated barrier material comprises a melting point lower than a melting point of a metal which is used to form the molten metal.

12. The system of claim 2, wherein the heated barrier material comprises a boiling point higher than a printing temperature at which the molten metal is printed to the substrate.

13. The system of claim 2, wherein the molten metal is substantially immiscible with the heated barrier material.

14. The system of claim 2, wherein the heated barrier material is unreactive with the molten metal.

15. The system of claim 2, further comprising an elevator component for raising the substrate out from the heated barrier material at the end of the printing operation.

16. The system of claim 2, wherein the substrate comprises a heated substrate.

17. The system of claim 2, further comprising a furnace in which the reservoir and the substrate are positioned during the printing operation.

18. A system for printing a component, comprising:
a controller;
a nozzle controlled for movement by the controller within a two dimensional plane, the nozzle having a tip configured to dispense a molten metal from the tip during a printing operation;
a reservoir;
a substrate positioned within the reservoir on which to receive the molten metal, the molten metal being used to form the component on the substrate in a layer-by-layer fashion; and
a heated barrier material in a molten state contained within the reservoir for forming a liquid barrier, and the nozzle tip configured to be fully submerged within the liquid barrier while dispensing the molten metal during the printing operation, the liquid barrier fully covering and encapsulating the molten metal as the molten metal is being deposited from the nozzle tip onto the substrate, and thus forming a barrier between an atmosphere in a vicinity of the substrate and the substrate; and
wherein the barrier material comprises a melting point below a melting point of a metal material used to form the molten metal, and wherein the barrier material and the molten metal are substantially immiscible, and wherein the molten metal is non-reactive with the heated barrier material, so that the molten metal forms the component without interference from, and exclusive of, the heated barrier material.

19. The system of claim 18, wherein the substrate comprises a heated substrate.

* * * * *